(No Model.)

M. O. ROBERTS.
JOINT FOR SECTIONAL STEAM BOILERS.

No. 553,870.  Patented Feb. 4, 1896.

Witnesses:
Thomas M. Smith
Richard C. Maxwell

Inventor:
Milton O. Roberts
By J. Walter Douglass
Attorney.

ANDREW B GRAHAM PHOTO-LITHO WASHINGTON, D.C.

UNITED STATES PATENT OFFICE.

MILTON O. ROBERTS, OF COLLEGEVILLE, PENNSYLVANIA.

JOINT FOR SECTIONAL STEAM-BOILERS.

SPECIFICATION forming part of Letters Patent No. 553,870, dated February 4, 1896.

Application filed November 30, 1895. Serial No. 570,603. (No model.)

*To all whom it may concern:*

Be it known that I, MILTON O. ROBERTS, a citizen of the United States, residing at Collegeville, in the county of Montgomery and State of Pennsylvania, have invented certain new and useful Improvements in Joints for Sectional Water or Steam Boilers, of which the following is a specification.

My invention has relation to a joint for sectional water or steam boilers or the like; and in such connection it relates particularly to the construction and arrangement of such a joint.

The principal objects of my invention are, first, to provide a simple, practically steam-tight and durable tapered joint between sections or tubes in a sectional water or steam boiler, and, second, to provide a tapered joint between two sections consisting of a thimble or conical projection on one section fitting tightly into a similar-shaped socket or opening in the second section, the socket or opening being annularly grooved internally, said groove or grooves being triangular or conical in cross-section with the apex pointing downward toward the thimble fitted into said socket.

My invention, stated in general terms, consists of a tapered joint for sectional water or steam boilers constructed and arranged in substantially the manner hereinafter described and claimed.

The nature and scope of my invention will be more fully understood from the following description, taken in connection with the accompanying drawings, forming part hereof, and in which—

Figure 1:
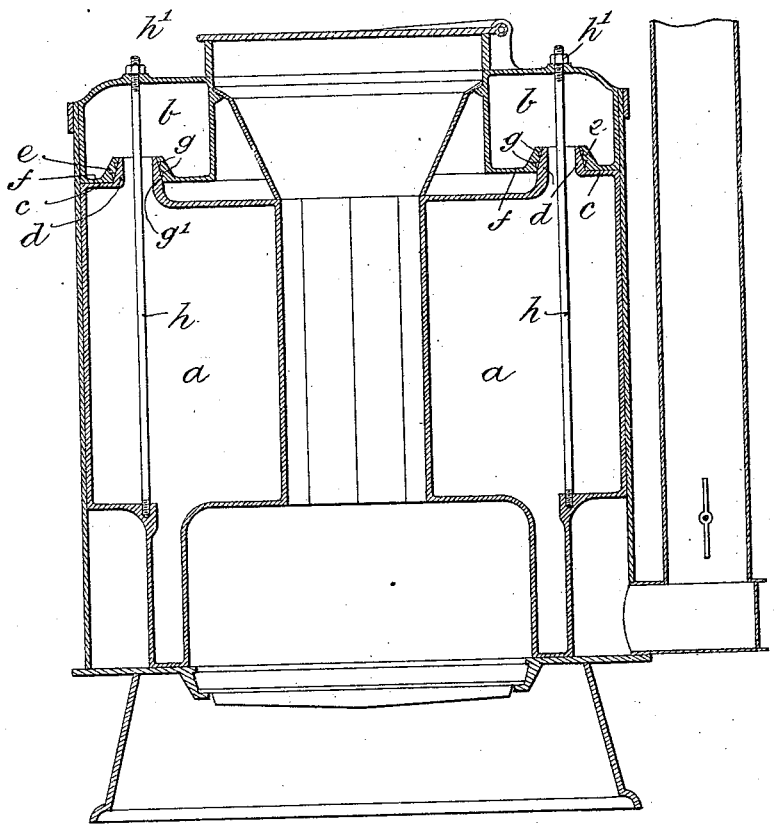
Figure 2:
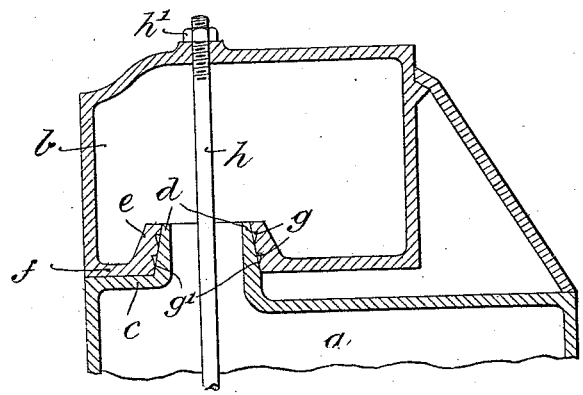

Figure 1 is a vertical central section of a sectional water or steam boiler, illustrating two sections or compartments united together by joints embodying the main features of my invention; and Fig. 2 is a similar section enlarged of one of said joints.

Referring to the drawings, $a$ represents the main water or steam chamber, and $b$ the dome or auxiliary water or steam chamber. These chambers are united by tapered joints constructed preferably as follows: On the top wall $c$ of the chamber $a$ is formed a thimble or conical tubular projection $d$, tapering upward from the wall $c$ and projecting into a similarly-shaped socket or opening $e$, extending from the crown-plate $f$ of the dome $b$ into the interior thereof. The tapered tube or thimble $d$ fits tightly into the socket or opening $e$. Both the interior of the socket $e$ and exterior of the thimble $d$ are respectively ground, so that a solid bearing throughout exists between the two united parts at the top, middle and bottom thereof.

On the interior of the socket $e$ are formed preferably two annular grooves $g$, which in cross-section are triangular or conical, the apex $g'$ of the groove pointing downward toward and terminating at the inclined or tapered side of the projecting thimble $d$, thereby establishing a knife-edged packing-joint at the point of contact of one with the other, as fully illustrated in Fig. 2. These grooves are filled with preferably a thick lubricant, such as a mixture of plumbago or black-lead with oil. The two sections or compartments are fastened together by a bolt $h$, one end of which is screwed into the bottom of the compartment $a$ and the other fastened down upon the roof of the dome $b$ by means of a nut $h'$.

The arrangement thus described forms an enduring and perfectly tight joint. Any pressure upon the joint from the dome $b$ serves only to drive or pack the lubricant in the grooves $g$ toward the apex $g'$, and thus establishes and maintains an absolutely water or steam tight joint. The two sections may be easily separated, the grooves in the socket lubricating the joint and preventing the formation of rust.

It is obvious that the relationship of the parts forming my improved joint may be varied without departing from the spirit of my invention, so that the grooved socket $e$ may be formed in the roof of the compartment $a$ or in a boiler-plate, while the projecting thimble $d$ may be formed on the crown-plate $f$ of the compartment $b$ or on the end of a water or steam tube fitted into a boiler-plate.

Having thus described the nature and objects of my invention, what I claim as new, and desire to secure by Letters Patent, is—

1. A joint for sectional water or steam boilers, comprising a conical thimble projecting from one section or compartment, a socket or opening formed in the adjacent section or compartment and fitting tightly over said thimble, a groove or grooves formed in the interior of said socket and a thick packing fitting said groove or grooves and confined by said thimble, substantially as and for the purposes described.

2. A joint for sectional water or steam boilers, comprising a conical thimble projecting from one section or compartment, a socket or opening formed in the adjacent section or compartment and fitting tightly down upon said thimble, annular grooves formed in the interior of said socket, said grooves being triangular in cross-section and a thick lubricant packing fitted in said grooves and confined by said thimble, substantially as and for the purposes described.

In testimony whereof I have hereunto set my signature in the presence of two subscribing witnesses.

MILTON O. ROBERTS.

Witnesses:
J. WALTER DOUGLASS,
THOMAS M. SMITH.